United States Patent [19]

Rönnholm

[11] 4,111,743
[45] Sep. 5, 1978

[54] METHOD OF RECOVERING HEAT AS WELL AS FRACTIONS CONTAINING VOLATILE ALCOHOLS AND SULPHUR COMPOUNDS FROM BLACK LIQUOR IN CONNECTION WITH PULPING

[76] Inventor: Arvi Rönnholm, Uusitie 9, 28760 Pori 76, Finland

[21] Appl. No.: 784,315

[22] Filed: Apr. 4, 1977

[30] Foreign Application Priority Data

Apr. 12, 1976 [FI] Finland .................................. 760990

[51] Int. Cl.² ............................................. D21C 11/06
[52] U.S. Cl. ........................................ 162/16; 162/47; 203/96
[58] Field of Search ....................... 162/15, 16, 47, 68; 159/47 WL; 203/91, 98, 96

[56] References Cited

U.S. PATENT DOCUMENTS 3,432,402  3/1969  Herrlinger et al. ..................... 162/16
3,807,479  4/1974  Brannland et al. ............. 159/47 WL

*Primary Examiner*—S. Leon Bashore
*Assistant Examiner*—William F. Smith

*Attorney, Agent, or Firm*—Ladas, Parry, Von Gehr, Goldsmith & Deschamps

[57] ABSTRACT

A method of recovering heat as well as fractions containing volatile alcohols and sulphur compounds from black liquor obtained from pulping. In a vapor generator, water is, by means of vapor, liberated at a high temperature and under a high pressure from the expansion of black liquor removed from a digester, indirectly vaporized into low-pressure vapor, which is used for vapor treatment of chips before their introduction into the digester. The condensate produced in the vapor generator is, under pressure control, passed into a condenser device, which is operated at a pressure that is lower than the pressure in the black liquor escaping from the digester, preferably at the atmospheric pressure. The condensate fraction formed in the condenser device as well as the uncondensed gas fraction are cooled by means of indirect cooling and the volatile alcohols and sulphur compounds are recovered from these fractions. Waste water, preferably secondary condensate from the evaporation plant, is used as the vaporization liquid in the vapor generator.

5 Claims, 1 Drawing Figure

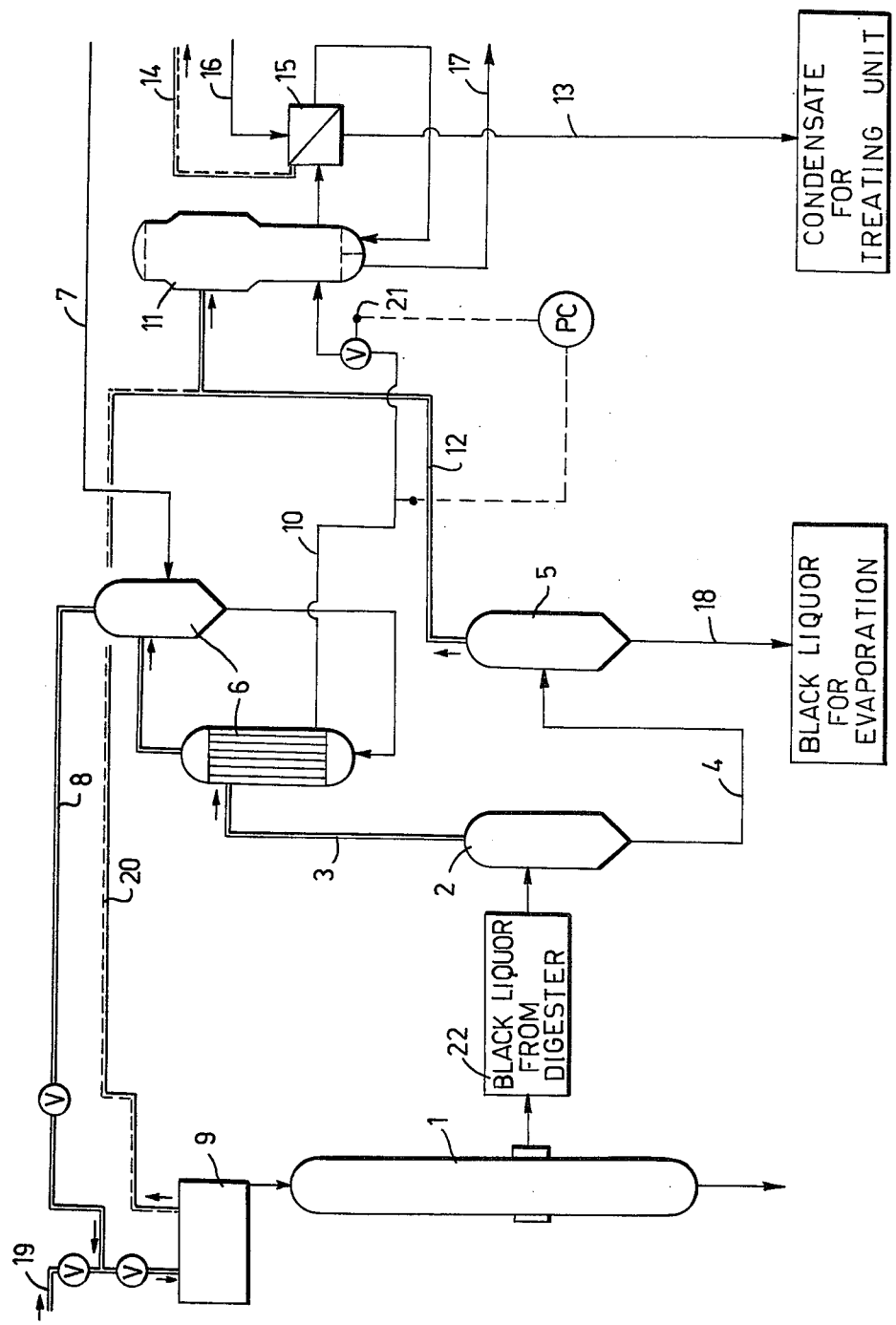

METHOD OF RECOVERING HEAT AS WELL AS FRACTIONS CONTAINING VOLATILE ALCOHOLS AND SULPHUR COMPOUNDS FROM BLACK LIQUOR IN CONNECTION WITH PULPING

The present invention is concerned with a method related to pulping, in particular with a new procedure by means of which heat and fractions containing volatile alcohols and sulphur compounds are recovered from black liquor obtained from chemical pulping, with maximum efficiency and economy without using the vapours leaving the black liquor for vapour treatment of the chips before their introduction into the digester.

For the recovery of heat and volatile alcohols and sulphur compounds from the black liquor coming from the digester different methods are known by evaporating the black liquor, for example multi-step evaporation and expansion evaporation.

The latter method has been in used in connection with the original continuous cooking process (KAMYR); moreover, variations of same exist (Rosenblad, Finnish Publication Print 45,474). An improved version of the above is the so-called expansion evaporation of black liquor (Finnish Publication Print 48,622 and Finnish Patent Application Nos. 474/71 and 1889/74). In these evaporation methods it is, however, difficult to recover efficiently volatile alcohols and sulphur compounds, which causes environmental problems and results in lower yields of by products of wood and the same time the heat economy of the cooking process itself is in some cases lowered.

The present invention is concerned with elimination of the above drawbacks, and this is achieved by means of a procedure in which water is vapourized indirectly, by means of the vapour liberated in connection with the expansion of the black liquor from the digester, into low-pressure vapour, which is used for vapour treatment of the chips before they are introduced into the digester.

The method in accordance with the present invention involves the advantage that the volatile alcohols and sulphur compounds liberated from the black liquor in connection with expansion are not circulated and that they are not concentrated between the expansion tank, vapour-treatment vessel, and the digester, for which reason, consequently, no losses of by-products are produced in connection with the introduction of the vapour liberated in connection with the expansion to the chips and whereby, consequently, the vapour does not leave the digester together with the pulp, but it can be removed immediately for further treatment as a fraction produced during the cooking circulation.

It is characteristic of the method in accordance with the invention that water is, by means of indirect heat-exchange, vapourized in a vapour generator by means of the vapour liberated from the black liquor obtained from the digester, whereby the vapour is used for vapour treatment of the chips before the chips are introduced into the cooker, and that the condensate from the vapour generator is introduced into a condensate device working under a lower pressure.

Another characteristic feature of the invention is that the condensate fraction produced in the condensator device and the uncondensed gas fraction are cooled by means of indirect cooling before they are taken out for recovery of the volatile alcohols and sulphur compounds.

The method in accordance with the invention further involves the remarkable advantage that by means of the method it is possible to circulate certain types of waste water to the process in the form of vapour; moreover, it is possible to generate steam from the primary condensate, which steam can be connected with the low pressure network, whereby the heat economy of the cooking process is improved.

The invention and its additional features will be described more closely below with reference to the attached FIGURE.

The FIGURE schematically describes such a method in accordance with the invention in which a continuous digester 1 is used and in which displacement of the black liquor is performed. The displaced black liquor is removed at the digester temperature and under the digester pressure and is introduced into a first expansion tank 2. In the expansion tank, in which the pressure is lower than in the digester, the black liquor is expanded and vapour is liberated. The liberated vapour mixture 3 is passed into the vapour generator 6, which is used under a pressure equalling that of the expansion tank 2 and in which the vapour mixture is brought into indirect heat-exchanging contact with the water 7 passed into the vapour generator, and from which the vapour produced is introduced into the chips-treatment vessel 9, wherein the chips absorb heat from the vapour, which vapour is thereby cooled and condensed.

The entire quantity of vapour liberated at the expansion step is, however, not condensed on the chips surface, but some of it escapes with the air liberated from the chips and is passed through the pipe 20 into the condenser device 11 or enters a separate condenser device, from whose condensate turpentine is separated by means of a decanting procedure in itself known.

The condensate 10, which is formed in the vapour generator 6 by means of indirect heat exchange, enters into the condensator device 11, which is, by means of a regulating means 21, kept at a lower pressure, preferably atmospheric pressure. The remaining black liquor from the expansion tank 2 is passed through the pipe 4 into the expansion tank 5, in which there is a lower pressure than in the expansion tank 2. The vapour mixture 12, which has been made free from the black liquor in the expansion tank 5, is passed into the condenser device 11 in order to be condensed by means of indirect condensation. The black liquor 18 is removed from the expansion tank for further concentration. The condensate formed by means of indirect condensation in the condenser device as well as the uncondensed vapours collected into the condenser device are passed into a cooling heat-exchanger 15 in order to produce an indirect heat-exchange with the cooling water 16 passed into the heat-exchanger. The cooled liquid fraction 13 and the uncooled gas fraction 14 are removed separately in order to be treated further for the purpose of recovery of volatile alcohols and sulphur compounds.

The cooling water 16 from the heat exchanger 15 is passed into the condenser device 11, from which the warm water 17 is passed, e.g., to pulp washing.

When the digester 1 is started, primary steam is taken into the chips-treatment vessel 9 through the pipe 19 until vapour can be obtained from the vapour generator with a sufficiently high pressure for performing the vapour treatment of the chips.

The embodiment described above can be modified in several ways. Thus, the water passed into the vapour generator can consist of primary condensate, whereby the vapour from the vapour generator can be combined with the low-pressure network, or, e.g., of secondary condensate from the concentrated-liquor end of the evaporation section, whereby the waste water is restored into the circulation. Likewise, the cooling water 16 from the heat-exchanger 15 can be separated to a separate stream, and in connection with the condenser device 11 it is possible to use a separate cooling-water stream.

The advantages of the method in accordance with FIG. 1 can be realized better if it is remembered that for vapour treatment of chips, as is known, 0.35 to 0.65 tons of vapour at a pressure of approximately 2 bars are required per ton of air-dry pulp. As an average value can be mentioned 0.5 tons per ton of air-dry pulp. When, e.g., secondary condensate obtained from the second evaporation step is used, the temperature of the condensate is approximately 120° C.; or the primary condensate is used, with a temperature of, e.g., approximately 135° C.

In order to produce 0.5 tons of vapour with the above pressure per ton of air-dry pulp from water at a temperature of 120° C. in the vapour generator with a temperature difference of 12° C., 0.508 tons of vapour at a temperature of 132° and at a pressure of approximately 2.95 bars per ton of air-dry pulp are required. This quantity of vapour must be produced at the first expansion.

Let us adopt as a starting point that 10.84 tons of black liquor per ton of air-dry pulp shall be transferred at 160° C. and with a dry-substance content of 14.2%. The other quantities and temperatures given have been calculated on the basis of vapour-formation heat, the specific heat for black liquor in view of different contents of dry substances, etc. (e.g., publication *Ekono* 76). For the sake of completion, specific pressures, temperatures, material quantities, and other conditions are mentioned here, but it should be noticed that these values can be varied within wide limits depending on the cooking conditions.

The pressure regulator 21 for the condensate after the vapour generator 6 in FIG. 1 is adjusted to a value of 2.95 bars (at 132° C.), and the black liquor 22 from the digester is pumped into the first expansion tank 2, wherein the pressure is rapidly lowered to a value of 2.95 bars. This means that the quantity of vapour mentioned above is formed at a temperature of 132° C. and this vapour is passed into the vapour generator 6.

The liquor form the first expansion tank 2 is immediately thereupon passed into the second expansion tank 5 via the pipe 4. This expansion tank is operated at a pressure lower than that of the first expansion tank 2, whereby the pressure is preferably the atmospheric pressure. At this expansion, 0.533 tons of vapour 12 is formed per ton of air-dry pulp, which vapour is passed into the same condenser device 11; into the same condenser device are expanded the condensate from the vapour generator 6 as well as the vapour mixture formed in the vapour-treatment vessel 9, the quantity of which is approximately 0.12 tons of vapour per ton of air-dry pulp. After the first expansion, there are 9.799 tons of liquor remaining per ton of air-dry pulp, and this liquor, with a dry-substance content of 15.71% and a temperature of 102° C. is removed from the expansion tank 5 for further concentration.

The quantity of the condensate from the condenser device obtained by means of indirect condensation, in this case 1.1614 tons per ton of air-dry pulp, as well as the uncondensed gases are passed into the cooling heat-exchanger 15. The gas fraction cooled by cooling water 16 by indirect cooling as well as the uncondensed gas fraction 14 are removed each of them separately for further treatment in order that volatile alcohols and sulphur compounds could be recovered.

If the primary condensate with a temperature of 135° C. is used for producing vapour for the vapour treatment of the chips, the necessary quantity of vapour from the first expansion tank is reduced, but the pressure of same is increased, from which it follows that the pressure of the vapour that is passed to expansion increases, and this permits its combination with the low-pressure network.

The quantity of condensate from the vapour liberated at the expansion is, however, not changed, nor is the content of dry substances in the remaining liquor obtained from the second expansion tank.

The quantity of the condensate fraction obtained in the way described above is 1.1614 tons per ton of air-dry pulp, which corresponds a condensate quantity of approximately 14.52 tons per hour at a production rate of 300 tons of air-dry pulp per 24 hours.

The following table 1 indicates what quantities of different recoverable components will be included in said condensate fraction when the procedure is as described above.

Table 1

| Component | Recoverable quantity kg per ton of air-dry pulp | % as calculated on the quantity formed |
|---|---|---|
| Methanol | 2.9 to 4.2 | 42 |
| Turpentine | 4.5 to 12.0 | 65 to 75 |
| Ethanol | 0.4 | 65 |
| Acetone | 0.1 | 65 |
| S$^{--}$ | 0.3 | |

EXAMPLE OF PERFORMANCE

The initial situation is that the temperature in the digester is 160° C., the quantity of black liquor to be transferred 10.84 tons per ton of air-dry pulp, and the dry-substance content in the black liquor 14.2%, which values correspond those of black liquor (kappa 48) from a normal continuous sulphate cooking (kraft). When other types of cooking are being used, the cooking temperature can be varied within the range of 160° to 178° C., e.g., the cooking temperature for sawdust of soft wood is approximately 178° C., for birch chips approximately 165° C., for chips of softwood timber and softwood lumber approximately 170° C., when the kappa is ~35, for any other except birch chips; for birch chips the kappa is 22.

Pulp manufacturing II B 1 15

The quantity of liquor also varies with different types of pulps depending on the proportion of liquid to wood that is used.

Pulp manufacturing II B 1 55

The quantity mentioned in the example corresponds a liquid to wood proportion of 3.5, a dry-substance content of 14.2%, and a quantity of dry substances of approximately 1.32 tons per ton of air-dry pulp. The quantity of dry substance is changed with the obtained pulp output.

The temperature limits can be considered to be as follows:

| | |
|---|---|
| Sulphate | t = 155 → 180° C (note corresponding pressure)<br>dry substances 12 → 17% 5.5 to 10 bars<br>ratio of liquid to wood 3 → 6 |
| Sulphite | t = 120 to 150° C p = 4.7 to 7 bars<br>dry substances 8 to 12% |

When it is removed from the digester, the liquor has the specific temperature, quantity, and dry-substance-content values of the cooking process concerned.

The quantity of vapour required for the vapour treatment of chips can always be obtained under the desired pressure by adjusting the pressure after the first expansion.

What I claim is:

1. A method of recovering heat and fractions containing alcohols and sulphur compounds from black liquor obtained from pulping cellulosic materials which comprises expanding black liquor removed from a digester into a low pressure vapor mixture, passing said low pressure vapor mixture to a vapor generator where said vapor mixture is brought into indirect heat exchange contact with water, passing the condensate formed in the vapor generator to a surface condenser while controlling the pressure to obtain a temperature difference between said vapor mixture and said water sufficient to vaporize said water to steam, said surface condenser being at a pressure lower than the pressure of the black liquor from the digester and said steam being used for presteaming chips before introducing the chips into the digester, cooling the condensate fraction formed in the surface condenser and the uncondensed gas fraction by indirect cooling, and recovering the volatile alcohols and sulphur compounds from said fractions.

2. A method as claimed in claim 1 which comprises using waste water as the water in the vapor generator for generating steam for said presteaming of said chips.

3. A method as claimed in claim 2, which comprises condensing the aeration vapors removed from said presteaming of said chips in said surface condenser.

4. A method as claimed in claim 1, which comprises using primary condensate as said water vaporized to steam, and combining the steam produced with the low-pressure steam network.

5. A method as claimed in claim 4, which comprises condensing the aeration vapors removed from said presteaming of said chips in said surface condenser.

* * * * *